United States Patent [19]
Gregg et al.

[11] Patent Number: 5,598,442
[45] Date of Patent: Jan. 28, 1997

[54] SELF-TIMED PARALLEL INTER-SYSTEM DATA COMMUNICATION CHANNEL

[75] Inventors: Thomas A. Gregg, Highland; Robert S. Capowski, Verbank; Daniel F. Casper, Poughkeepsie; Frank D. Ferraiolo, New Windsor, all of N.Y.

[73] Assignee: International Business Machines Corporation, Armonk, N.Y.

[21] Appl. No.: 261,522

[22] Filed: Jun. 17, 1994

[51] Int. Cl.$^6$ .................................. H04L 7/00
[52] U.S. Cl. .................. 375/354; 395/891; 395/250; 375/260
[58] Field of Search .................. 375/260, 267, 375/347, 354, 219, 220, 355, 357, 362, 349; 370/100.1, 91, 105.1, 110.1; 395/250, 200.17, 872, 891, 309

[56] References Cited

U.S. PATENT DOCUMENTS

| | | | |
|---|---|---|---|
| 4,050,097 | 9/1977 | Miu et al. | 364/200 |
| 4,271,518 | 6/1981 | Birzele et al. | 371/37.1 |
| 4,371,962 | 2/1983 | Zeitraeg | 370/105 |
| 4,388,683 | 6/1983 | Beifuss et al. | 395/286 |
| 4,486,739 | 12/1984 | Franaszek | 341/59 |
| 4,642,791 | 2/1987 | Mallozzi et al. | 395/891 |
| 4,694,472 | 9/1987 | Torok et al. | 375/354 |
| 4,710,922 | 12/1987 | Scott | 370/112 |
| 4,717,914 | 1/1988 | Scott | 340/825.06 |
| 4,771,440 | 9/1988 | Fromm et al. | 375/279 |
| 4,782,499 | 9/1986 | Clendening | 375/358 |
| 4,818,995 | 4/1989 | Takahashi et al. | 341/94 |
| 4,914,429 | 4/1990 | Upp | 370/58 |
| 5,022,057 | 6/1991 | Nishi et al. | 375/373 |
| 5,051,990 | 9/1991 | Kato | 370/105 |
| 5,067,076 | 11/1991 | Hantsch et al. | 395/891 |
| 5,113,385 | 5/1992 | Murakami et al. | 370/102 |
| 5,251,319 | 10/1993 | Wagai et al. | 339/154 |

OTHER PUBLICATIONS

Stallings, Data and Computer Communications, 1994 pp. 151–153 (1987 EIA 232D).

*Primary Examiner*—Benedict V. Safourek
*Assistant Examiner*—William Luther
*Attorney, Agent, or Firm*—Lynn L. Augspurger; Laurence J. Marhoefer

[57] ABSTRACT

A self-timed interface (STI) links two physically separated systems or nodes. A transmit state machine forms each word in a serial bit stream into a plurality of bytes and generates idle and data character sequences. Each byte is separately encoded in a run-length-limited code, along with its idle and data character sequences. Each of the plurality of bytes is transmitted on a separate conducting line along with a transmit clock signal that is also transmitted on a separate line. At the receiver, the data stream on each line is separately phase aligned with the clock, and bit aligned.

7 Claims, 4 Drawing Sheets

SELF-TIMED PARALLEL INTER-SYSTEM DATA COMMUNICATION CHANNEL

CROSS REFERENCES TO RELATED APPLICATIONS

The present United States patent application is related to the following co-pending United States patent applications incorporated herein by reference:

Application Ser. No. 08/262,087, filed Jun. 17, 1994 (attorney Docket No. PO9-93-053), entitled "Edge Detector," and assigned to the assignee of this application.

Application Ser. No. 08/261,515, filed Jun. 17, 1994 (attorney Docket No. PO9-93-054), entitled "Self-Timed Interface," and assigned to the assignee of this application.

Application Ser. No. 08/261,561, filed Jun. 17, 1994 (attorney Docket No. PO9-93-057), entitled "Enhanced Input-Output Element," and assigned to the assignee of this application.

Application Ser. No. 08/261,603, filed Jun. 17, 1994 (attorney Docket No. PO9-93-058), entitled "Massively Parallel System," and assigned to the assignee of this application.

Application Ser. No. 08/261,603, filed Jun. 17, 1994 (attorney Docket No. PO9-93-059), entitled "Attached Storage Media Link," and assigned to the assignee of this application.

Application Ser. No. 08/261,641, filed Jun. 17, 1994 (attorney Docket No. PO9-93-060), entitled "Shared Channel Subsystem," and assigned to the assignee of this application.

DESCRIPTION

BACKGROUND OF THE INVENTION

1. Field of the Invention

This invention relates to an inter-system data communication channel comprised of parallel electrical conductors that simulate the performance of a bit serial, optical communications link.

2. Description of the Prior Art

As will be appreciated by those skilled in the art, very high speed data communications links are typically bit serial fiber optic links. While generally satisfactory in operation, such fiber optic links are expensive in their implementation.

SUMMARY OF THE INVENTION

An object of this invention is the provision of a data communication link that emulates the performance of bit serial and fiber optic link, but with less expensive electrically conducting components.

Briefly, this invention contemplates the provision of a self-timed interface (STI) to link two physically separated systems or nodes. A transmit state machine forms each word into a plurality of bytes and generates idle and data character sequences. Each byte is separately encoded in a run-length-limited code, along with its idle and data character sequences. Each of the plurality of bytes is transmitted on a separate conducting line along with a transmit clock signal that is also transmitted on a separate line. At the receiver, the data stream on each line is separately phase aligned with the clock. The bit synchronization process can be rapidly established, for example on the order of 200 microseconds. The phase of the incoming data is manipulated on a per line basis until the data valid window or bit interval is located. This is accomplished in a preferred embodiment using a phase detector that locates an average edge position on the incoming data relative to the local clock. Using two phase detectors one can locate two consecutive edges on data and these two consecutive edges define the bit interval or data valid window. The data to be sampled by the local clock is the phase of the data located halfway between the two edges of the data.

Synchronization maintenance occurs as part of the link operation in response to temperature and power supply variations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
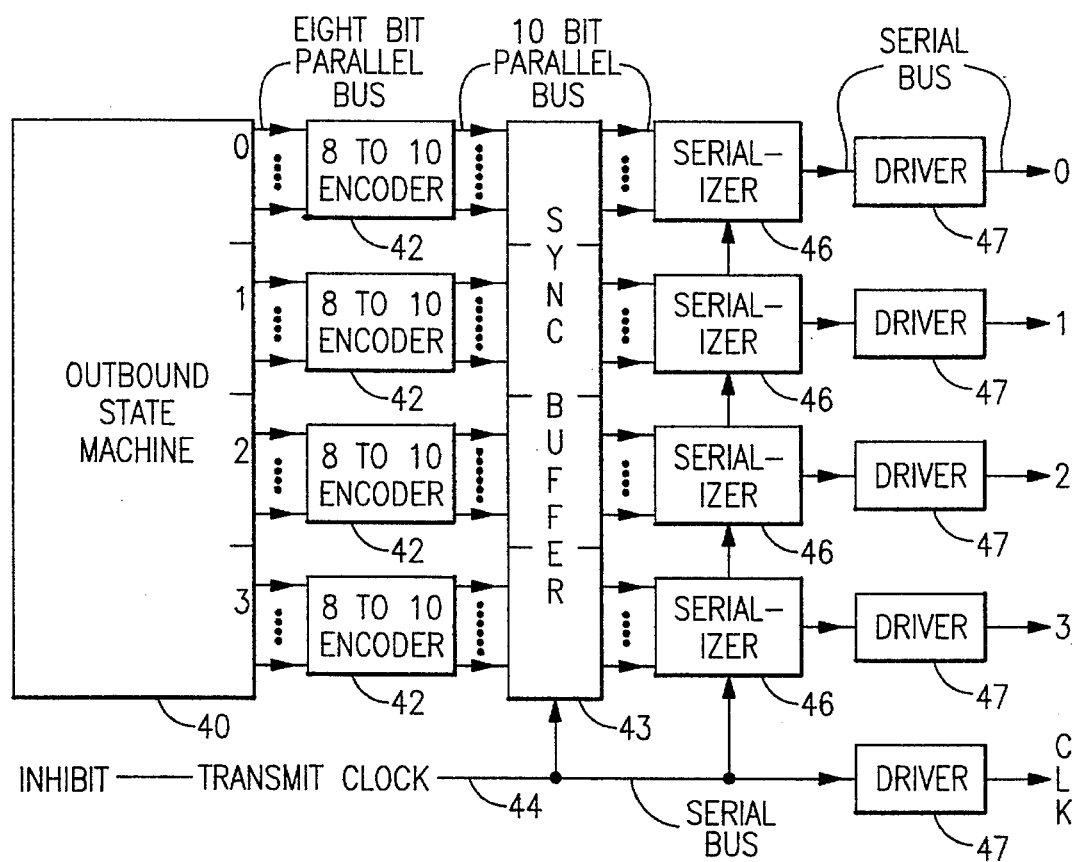
FIG. 1 is a block diagram of a transmit node in accordance with one specific embodiment of the invention.

The transmit function is illustrated in FIG. 1. An outbound state machine 40 generates the frames and sequences (idle and continuous) for the outbound link and, in this embodiment, presents the information four characters at a time to four independent run length limited encoders 42 (e.g., 8/10 encoders). See U.S. Pat. No. 4,486,739, issued Dec. 4, 1984 of Franaszek et al. entitled "Byte oriented DC Balanced (0,4) 8B/10B partitioned Block Transmission Code" assigned to the assignee of the present invention. Each encoder 42 has a run length disparity control that is independent of every other encoder 42 and the disparity of the four characters of each idle word may differ. In this specific embodiment of the invention, the idle sequence is a comma character (e.g., K28.5) and is transmitted on all four data conductors at the same time (within skew limits). Similarly, the null word/character uses another comma character. A zero disparity character is sent over all four data conductors at the same time. An example of a suitable null word/character zero disparity character is K28.4 (001111 0010 and 110000 1101). Further, as frames are transmitted, the relationship of the disparity among the four idle characters varies because the disparity of each of the four portions of the frame may also differ. A sync. buffer 43 operates as a single 40-bit-wide buffer. It is read out of the sync. buffer 43 at a rate which is preferably a fraction of the rate of the STI transmit clock signal 44, which is used to clock the transmitted data signal on each bus line. In the preferred embodiment, the STI transmit clock signal 44 rate is divided by ten and this fractional version of the STI transmit clock signal is used to read out data from the sync. buffer. There are four portions of buffer 43 and each of the four portions of the sync. buffer keeps track of the running disparity so that it can properly insert a null character and can generate an off-line sequence. These words are inserted and sent to all four buffer portions at the same time and only the running disparity of each buffer portion is independent. Each portion of the buffer is coupled to a serializer 46. The serializers 46, for example, are ten bits wide after input, receive a character on the order of every 50 ns and transmit at their output a serial bit stream at about 200 megabits per second. The serial output data stream from serializers 46 are coupled by the clock signals to a driver 47 connected to each bus line and the clock line.

Bits zero through seven, of byte 0 will be serialized and transmitted on line 0 of the self-timed interface. Bits zero through seven from byte 1 are transmitted on line 1, and so on.

In order to minimize the bandwidth requirements of link, the self-timed interface clock is one-half the frequency of the transmitted data (baud) rate, i.e., a 100 Mhz clock will be used for a 200 Mbit/sec data rate. The data is transmitted with both edges of the clock. The pulse symmetry and clock duty cycle should be controlled closely but the frequency stability of the self-timed interface clock is not critical since the interface is synchronous.

Figure 2:
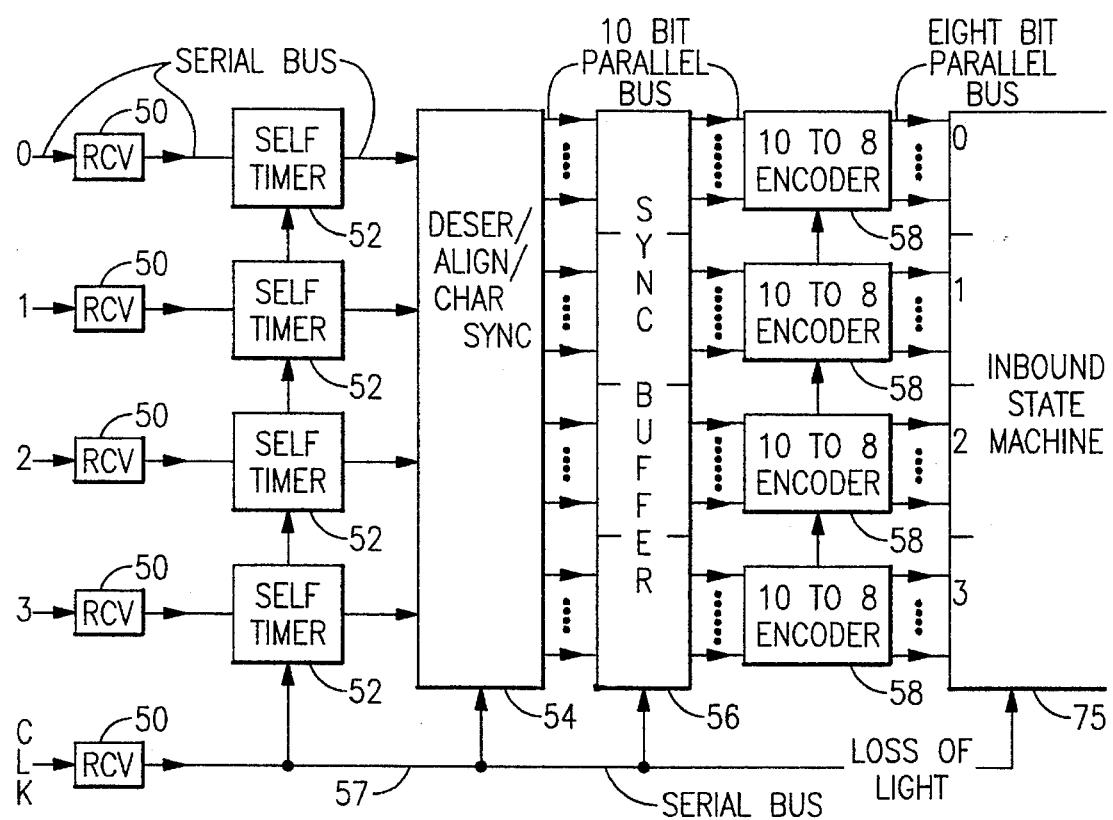
FIG. 2 is a block diagram of a receiving node for the specific embodiment of the invention shown in FIG. 1.

Referring now to FIG. 2, the receiver side of the self-timed link in this specific embodiment of the invention has five separate receivers 50, one connected to each of the four data lines and one connected to the clock line. The output of each receiver 50, whose input is connected to a data line, is connected to the input of a self timer 52 whose other input is the received clock signal, as explained in more detail in connection with FIG. 3. The self-timers 52 respectively phase align the data stream on each line with the received clock signal. The output of each self-timer 52 is coupled as an input to a logic array 54 that deserializes each input, and aligns and synchronizes the characters among the four inputs, as explained in greater detail in connection with FIG. 4. In this specific embodiment of the invention, the data streams are deserialized into ten-bit characters and the four data streams are aligned by searching for the idle pattern. The aligned data is then sent to a sync. buffer 56 where it is synchronized with the link clock input on lead 57. An output of the sync. buffer corresponding to each data channel is coupled to the input of a decoder 58, in this exemplary embodiment of the invention, a 10 to 8 decoder. Each decoder is independent of the others and each has its own disparity control so that there is no disparity relationship among the decoders. The inbound state machine examines the bytes from the decoders to detect frames, sequences (idle and continuous), and word synchronism.

Figure 3:
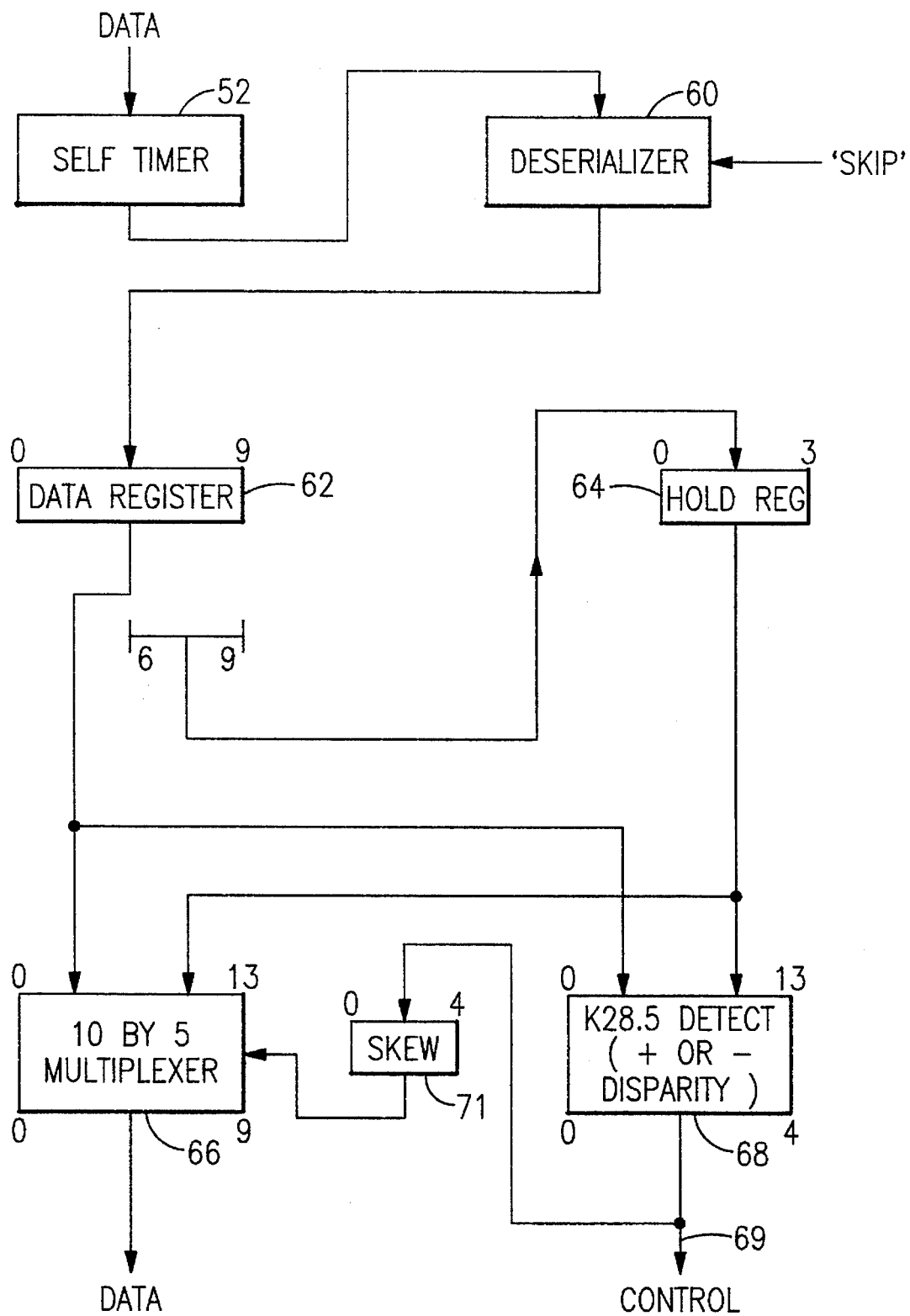
FIG. 3 is a block diagram showing certain specifics of the receiving node shown in FIG. 2.
Figure 4:
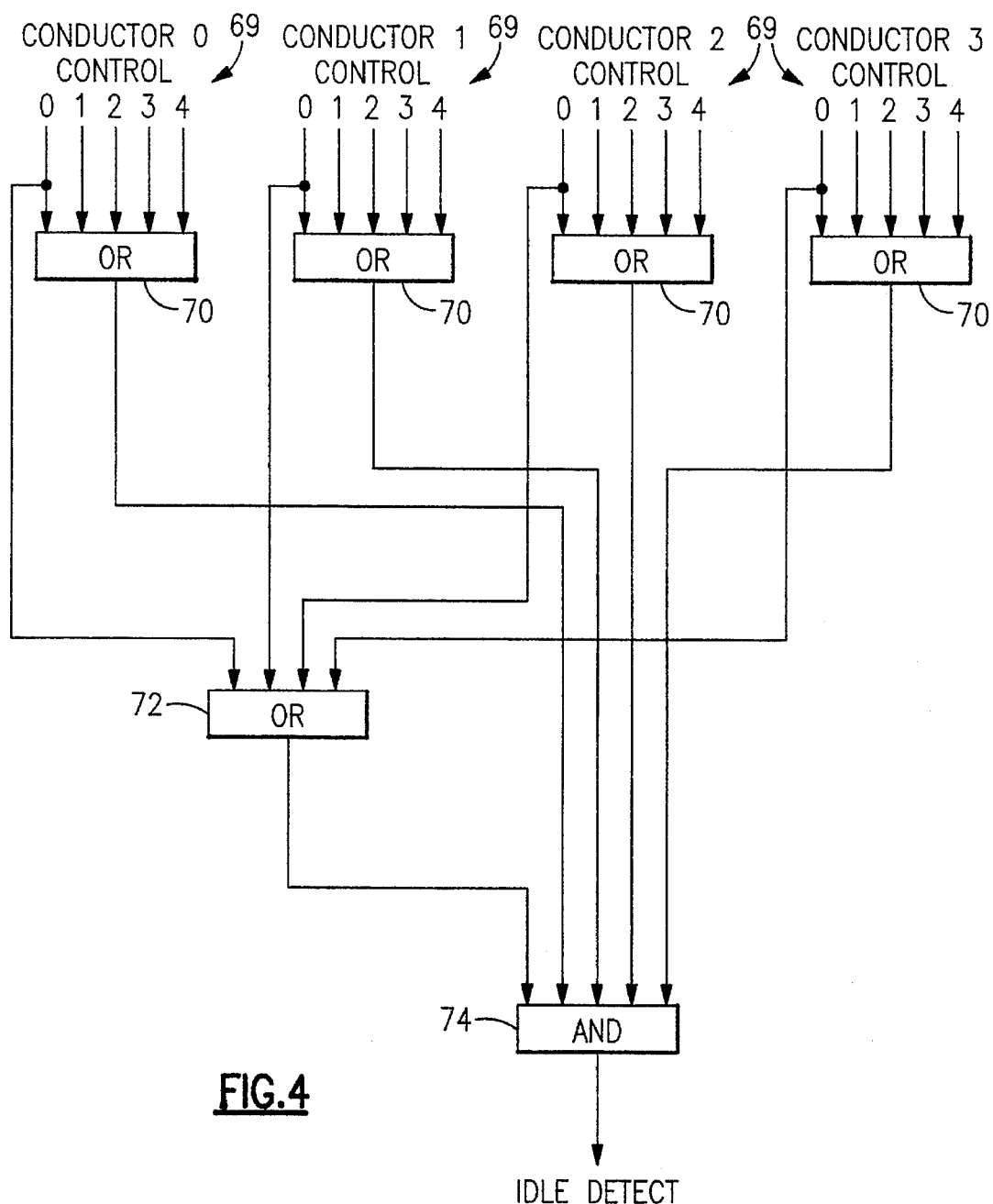
FIG. 4 is a block diagram showing further specifics of the receiving node illustrated in FIGS. 2 and 3.

The data path for the logic array 50 is illustrated in more detail in FIGS. 3 and 4. Referring first to FIG. 3, that has been phase aligned with the received clock signal, data from each self timer 52 is coupled to a deserializer 60 where it is deserialized into 10 bit characters. The deserializer 60 includes a 'SKIP' function that can discard a bit from the data stream. The output from the deserializer 60 is coupled to a ten-bit data register 62; bits 6–9 of register 62 are also stored in a hold register 64. The outputs of both the data register 62 and the hold register 64 are coupled to a 10 by 5 multiplexer 66 and a K28.5 character detector 68. The multiplexer 66 can select any one of five character windows that are provided by the combination of the data register 62 and the hold register 64. The K28.5 character detector 68 senses the presence of either polarity of the K28.5 character (or at least the first 7 bits thereof) and couples the bit position (5 bit signal 69) to the control logic of FIG. 4 and a skew register 71, which is five bits wide and controls the multiplexer 66.

The control logic for each of the four data lines is illustrated in FIG. 4. Each of the four Data Paths (FIG. 3) sends a five-bit control signal 69 to the Control Logic. As described above, these five bit signals indicate the boundary of the K28.5 character (only one of the five bits should ever be on). Each of the four groups of these signals feeds a five input OR circuit 70 whose output indicates that a K28.5 character is detected within the 14 bit window provided by the data register 62 and hold register 64 (FIG. 3). The first bit of each of the four groups feeds a four input OR 72 circuit whose output indicates that at least one of the conductors logic has detected a K28.5 character in a data register. Finally, a five input AND circuit 74 fed by the OR circuits 70 indicates that all of the conductors' logic have detected a K28.5 character and that at least one is in the 'earliest' bit position (contained in the data register). The output of the AND circuit is called an IDLE DETECT line.

Referring now back to FIG. 2, the data output from the 10 TO 8 decoders 58 is coupled to an inbound state machine 75 (ISM) which examines the characters to determine if all of the conductors have achieved character synchronism. The data from the 10 TO 8 DECODERS is valid (or 'good') if either all four characters are the IDLE characters or all four characters are data (DXX.Y) characters. An error (or 'bad' word) is detected if any other combination of characters or any code violations are detected. If enough 'bad' words are received in a short enough interval, the ISM 75 takes the link out of the sync acquired state. Likewise, if the link is not in the sync acquired state and enough idle words are received, the link enters the sync acquired state.

When the ISM 75 leaves the sync acquired state, a state machine is started which manipulates the 'SKIP' bits, ingates the SKEW registers, and examines the IDLE DETECT line. First, all four SKIP lines are activated causing one bit from each of the conductors' bit streams to be discarded. Next, the IDLE DETECT line is allowed to ingate all four SKEW registers once. If the control line does not activate within several cycles, the SKIP line is activated again. Once the control line from the Receiver Control Line has activated and the SKEW registers have been loaded, the state machine waits for about 32 cycles to see if the sync acquired state is entered. If this state is entered, the process is over. If not, the process is repeated by activating the SKIP lines. A timer which is running through this process, signals a failure state if the sync acquired state is not achieved.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. An inter-system data communication channel for coupling data words between two physically separated systems, comprising in combination:

an outbound transmit state machine for framing each word in said data words into a plurality of parallel bytes and for generating idle character sequences and data character sequences for each parallel byte;

means for separately encoding each of said parallel bytes along with its idle character sequence and data character sequence;

means to buffer store an encoded output of said means for separately encoding;

a bus coupled between said two physically separated systems, said bus comprised of a respective electrically conducting line for transmitting said each of said plurality of parallel bytes as a serial data stream and a separate line for transmitting a transmit clock signal;

means including parallel to serial conversion means and said transmit clock signal to couple synchronously said each of said plurality of parallel bytes as the serial data stream from said means to buffer store respectively to one said electrically conducting line;

means to couple said transmit clock signal to said separate line for transmitting the transmit clock signal;

a serial bit stream receiver respectively coupled to each said electrically conducting line and a transmit clock receiver coupled to said line for transmitting a transmit clock signal;

phase alignment means coupled to each said serial bit stream receiver and to said transmit clock receiver to separately phase align each serial data stream on each said electrically conducting line with said transmit clock signal; and means coupled to said clock phase alignment means to align bytes that were transmitted synchronously.

2. An inter-system data communication channel as in claim 1 wherein said means for separately encoding includes means for generating a d.c. balanced, run-length limited code.

3. An inter-system data communication channel as in claim 1 wherein said encoded output of said means for separately encoding is read into said means to buffer store by a local transmitter system clock and read out of said means to buffer store by said transmit clock signal.

4. An inter-system data communication channel as in claim 2 wherein an encoded output of said means for separately encoding is read into said buffer store by a local transmitter system clock and read out of said means to buffer store by said transmit system clock.

5. An inter-system data communication channel as in claim 1 further including means to align corresponding bytes that have been phase aligned with said transmit clock signal.

6. An inter-system data communication channel as in claim 5 wherein said means for separately encoding includes means for generating a d.c. balanced, run-length limited code.

7. An inter-system data communication channel for coupling data words between two physically separated systems, comprising in combination:

an outbound transmit state machine for framing each word in said data words into a plurality of parallel bytes and for generating idle character sequences and data character sequences for each parallel byte;

means for separately encoding each of said plurality of parallel bytes along with said idle character sequence and data character sequence for said each parallel byte;

means to buffer store an encoded output of said means for separately encoding;

a bus coupled between said two physically separated systems, said bus comprised of a respective electrically conducting line for transmitting said each of said plurality of parallel bytes as a serial data stream and a separate line for transmitting a transmit clock signal;

means including parallel to serial conversion means and said transmit clock signal to couple said each of said plurality of parallel bytes as the serial data stream from said buffer respectively to each said electrically conducting line;

means to couple said transmit clock signal to said separate line for transmitting a clock signal;

a serial bit stream receiver respectively coupled to each said respective electrically conducting line and a transmit clock receiver coupled to said line for transmitting said transmit clock signal;

phase alignment means coupled to each said serial bit stream receiver and to said transmit clock receiver to separately phase align each serial data stream on each said electrically conducting line with said transmit clock signal; and means coupled to said clock phase alignment means to align bytes that were transmitted synchronously;

said means to align bytes that were transmitted synchronously including means to phase adjust one said idle character sequence coupled to one said respective electrically conducting line with respect to said idle character sequences coupled to another said respective electrically conducting line.

\* \* \* \* \*

UNITED STATES PATENT AND TRADEMARK OFFICE
CERTIFICATE OF CORRECTION

PATENT NO. : 5,598,442
DATED : January 28, 1997
INVENTOR(S) : Gregg et al.

It is certified that error appears in the above-indentified patent and that said Letters Patent is hereby corrected as shown below:

Column 1, line 24        "08/261,603" should be --08/261,523--

Signed and Sealed this

Thirteenth Day of May, 1997

Attest:

BRUCE LEHMAN

Attesting Officer      Commissioner of Patents and Trademarks